(12) United States Patent
Yang et al.

(10) Patent No.: US 12,535,059 B2
(45) Date of Patent: Jan. 27, 2026

(54) SUPPORT APPARATUS FOR SHAFT SYSTEM, AND WIND TURBINE

(71) Applicant: GOLDWIND SCIENCE & TECHNOLOGY CO., LTD., Xinjiang (CN)

(72) Inventors: Yuliang Yang, Beijing (CN); Qian Li, Beijing (CN); Huixun Li, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 6 days.

(21) Appl. No.: 18/571,866

(22) PCT Filed: Mar. 31, 2022

(86) PCT No.: PCT/CN2022/084287
§ 371 (c)(1),
(2) Date: Dec. 19, 2023

(87) PCT Pub. No.: WO2023/045294
PCT Pub. Date: Mar. 30, 2023

(65) Prior Publication Data
US 2024/0280085 A1 Aug. 22, 2024

(30) Foreign Application Priority Data
Sep. 26, 2021 (CN) .......................... 202111128270.7

(51) Int. Cl.
*F03D 80/70* (2016.01)
*F03D 9/25* (2016.01)
(Continued)

(52) U.S. Cl.
CPC ............. *F03D 80/703* (2023.08); *F03D 9/25* (2016.05); *F16C 3/02* (2013.01); *F16C 19/38* (2013.01);
(Continued)

(58) Field of Classification Search
CPC .......... F03D 80/703; F03D 80/70; F03D 15/20
See application file for complete search history.

(56) References Cited

U.S. PATENT DOCUMENTS

| 2011/0150383 A1 | 6/2011 | Yoshida et al. |
| 2015/0030277 A1 | 1/2015 | Pick et al. |
| 2017/0074317 A1 | 3/2017 | Reichert et al. |

FOREIGN PATENT DOCUMENTS

| CN | 105508155 A | 4/2016 |
| CN | 106969030 A | 7/2017 |

(Continued)

OTHER PUBLICATIONS

The International Search Report mailed Jun. 17, 2022; PCT/CN2022/084287.

(Continued)

*Primary Examiner* — Courtney D Heinle
*Assistant Examiner* — John S Hunter, Jr.

(57) ABSTRACT

A support apparatus for a shaft system includes a first shaft, a second shaft, and a bearing arranged between the first shaft and the second shaft. The first shaft is sleeved at an outer peripheral side of the second shaft and is able to rotate relative to the second shaft by means of the bearing. The support apparatus includes: shaft end support members, at least a portion of the shaft end support members being rotatably supported in an axial direction at an outer side of a shaft end face of a first end of the second shaft; and connection assemblies. The connection assemblies in the axial direction of the shaft system are used for being connected between a first end of the first shaft and the shaft end support members.

20 Claims, 6 Drawing Sheets

(51) Int. Cl.
*F16C 3/02* (2006.01)
*F16C 19/38* (2006.01)

(52) U.S. Cl.
CPC ....... *F05B 2240/50* (2013.01); *F05B 2240/60* (2013.01); *F16C 2360/31* (2013.01)

(56) References Cited

FOREIGN PATENT DOCUMENTS

| CN | 110486237 | A | | 11/2019 | | |
|----|-----------|---|---|---------|---|---|
| CN | 112855763 | A | * | 5/2021 | ............. | F03D 80/70 |
| CN | 113294443 | A | | 8/2021 | | |
| DE | 102012221255 | A1 | | 5/2014 | | |
| WO | 2010/035549 | A1 | | 4/2010 | | |
| WO | 2015/021994 | A1 | | 2/2015 | | |
| WO | 2022/021535 | A1 | | 2/2022 | | |

OTHER PUBLICATIONS

Extended European Search Report dated Aug. 21, 2024; Appln. No. 22871359.0.

* cited by examiner

SUPPORT APPARATUS FOR SHAFT SYSTEM, AND WIND TURBINE

CROSS-REFERENCE TO RELATED APPLICATIONS

This application is a National Stage of International Application No. PCT/2022/084287, filed Mar. 31, 2022, which claims priority to and the benefit of Chinese Patent Application No. 202111128270.7, filed Sep. 26, 2021, the entireties of which are hereby incorporated herein by reference.

FIELD

The present application relates to the technical field of wind power generation, and in particular to a support apparatus for a shaft system and a wind turbine.

BACKGROUND

A generator of a wind turbine includes a fixed shaft and a movable shaft which are coaxial with each other, and further includes a main bearing arranged between the fixed shaft and the movable shaft. In actual operation, blades of the wind turbine transmit the wind load applied thereon to a hub, and the hub transmits the load to the main bearing through the movable shaft, and then transmits the load to the fixed shaft through the main bearing. The axial wind load in a constant direction can only be applied on the main bearing, which therefore adversely affects the fatigue life of the main bearing. Besides, the main bearing is arranged in a shaft system of the generator, and thus is inconvenient to disassemble and maintain, thereby adversely affecting the overall quality and life of the wind turbine.

SUMMARY

In order to solve the above technical problems, a support apparatus for a shaft system and a wind turbine are provided according to the present application. The support apparatus can prevent the axial load from acting directly on the bearing of the shaft system or reduce the axial load acting on the bearing of the shaft system, thereby improving the fatigue life of the bearing of the shaft system.

A support apparatus for a shaft system is provided according to an aspect of the present application. The shaft system includes a first shaft, a second shaft, and a bearing arranged between the first shaft and the second shaft. The first shaft is sleeved outside the second shaft and rotatable relative to the second shaft by means of the bearing. The support apparatus is configured to be provided at a first end of the shaft system in an axial direction, and the support apparatus includes: a shaft end support, at least part of which is rotatably supported in the axial direction on an outer side of a shaft end surface of a first end of the second shaft; a connecting assembly, configured to be connected between a first end of the first shaft and the shaft end support in the axial direction of the shaft system; and a pre-tightening member, configured to adjustably connect the connecting assembly with the shaft end support. An axial pre-stress is applied on the first shaft by the support apparatus, which frees the bearing of the shaft system from the axial load or reduces the axial load acting on the bearing of the shaft system, thereby improving the service life of the bearing.

According to an exemplary embodiment of the present application, the support apparatus further includes: a support portion and an auxiliary bearing. A first end of the support portion faces towards the shaft end support in the axial direction, and a second end of the support portion is fixedly connected to the shaft end surface of the first end of the second shaft. The auxiliary bearing is provided at the first end of the support portion and located outside the support portion in a radial direction of the shaft system. The shaft end support is supported on the support portion by means of the auxiliary bearing and is rotatable relative to the support portion by means of the auxiliary bearing.

According to an exemplary embodiment of the present application, the shaft end support may include a connecting end cap and a mounting seat connected to an outer periphery of the connecting end cap. The connecting end cap includes a shaft end top plate and a cylinder extending from the shaft end top plate toward a second end of the shaft system along the axial direction of the shaft system. The mounting seat is formed on an outer periphery of the cylinder. In the radial direction of the shaft system, an inner diameter of the cylinder is greater than an outer contour size of the first end of the support portion, the cylinder is sleeved on the first end of the support portion, and the auxiliary bearing is provided between an inner side of the cylinder and an outer side of the first end of the support portion.

According to an exemplary embodiment of the present application, the connecting assembly may include: a fixed seat, configured to be fixedly connected to the shaft end surface of the first end of the first shaft; and a connecting portion, connected between the fixed seat and the mounting seat.

According to an exemplary embodiment of the present application, the connecting portion may be rod-shaped members distributed at intervals along a circumferential direction of the support portion, where the rod-shaped members are hinged to the fixed seat, thereby realizing more flexible and convenient installing and disassembly of the rod-shaped members and the fixed seat.

According to an exemplary embodiment of the present application, the number of the rod-shaped members may be two or more, and the fixed seats, the mounting seats and the rod-shaped members have the same number as one another.

According to an exemplary embodiment of the present application, the cylinder may be in a bell-mouth shape, a diameter of which increases along the axial direction of the shaft system from the shaft end top plate toward the second end of the shaft system, and the mounting seat is a leg extending outwardly from an outer peripheral surface of the cylinder.

According to an exemplary embodiment of the present application, the pre-tightening member may be a nut, a first end of each of the rod-shaped members is provided with external threads, a through hole is formed in the mounting seat, and the first end of the rod-shaped member is in threaded connection with the nut after passing through the through hole.

According to an exemplary embodiment of the present application, the connecting assembly is a cylindrical member, a first end of the cylindrical member along the axial direction is provided with a first bearing seat, and the auxiliary bearing is arranged between a radial inner wall of the first bearing seat and a radial outer wall of the support portion along the radial direction of the shaft system. A second end of the cylindrical member along the axial direction is provided with a first fixed seat to be connected to the shaft end surface of the first end of the first shaft. The shaft end support is an annular plate connected to an axial end surface of the first bearing seat.

According to an exemplary embodiment of the present application, the pre-tightening member may be a bolt, a first threaded hole and a second threaded hole extending along the axial direction are respectively formed in the shaft end support and the first bearing seat, and the bolt is in threaded connection with the first threaded hole and the second threaded hole in sequence.

According to an exemplary embodiment of the present application, the support portion may include a second fixed seat, a support member and a second bearing seat along the axial direction, the second fixed seat is fixedly connected to a shaft end surface of a first end of the second shaft, and the auxiliary bearing is arranged between a radical inner wall of the connecting assembly and a radial outer wall of the second bearing seat along the radial direction.

According to an exemplary embodiment of the present application, the support member may be inclined from the second bearing seat toward the second fixed seat.

According to an exemplary embodiment of the present application, the support member may be rod-shaped members distributed at intervals along a circumferential direction of the support portion; or the support member may be a cylindrical member.

According to an exemplary embodiment of the present application, the support apparatus may further include a spring, which is arranged between the auxiliary bearing and the shaft end support along the axial direction and is in contact with an axial inner end surface of the shaft end support.

A wind turbine is further provided according to another aspect of the present application. The wind turbine includes: the support apparatus for a shaft system according to the above aspect; and a generator including the shaft system.

According to an exemplary embodiment of the present application, the bearing may be a double-row roller bearing, so that the preload is uniformly transmitted to the auxiliary bearing.

The support apparatus for a shaft system according to the present application can prevent the axial load from acting directly on the bearing of the shaft system or reduce the axial load acting on the bearing of the shaft system, thereby improving the fatigue life of the bearing of the shaft system.

In the wind turbine including the above support apparatus for the shaft system according to the present application, when the axial wind load is transmitted to the movable shaft, the axial preload generated by the above support apparatus for the shaft system can offset the axial wind load. The axial wind load is transmitted to the fixed shaft without transmitting through the main bearing, so that the main bearing does not bear the axial load or bears a small axial load, and thus the front and rear rows of rollers of the double-row tapered roller bearing are evenly loaded, which improves the overall fatigue life of the main bearing and makes the service life of the bearing longer than the design life.

BRIEF DESCRIPTION OF THE DRAWINGS

The above and other features and advantages of the present application becomes more apparent from the following detailed description of exemplary embodiments of the present application with reference to the accompanying drawings, in the drawings.

Figure 1:
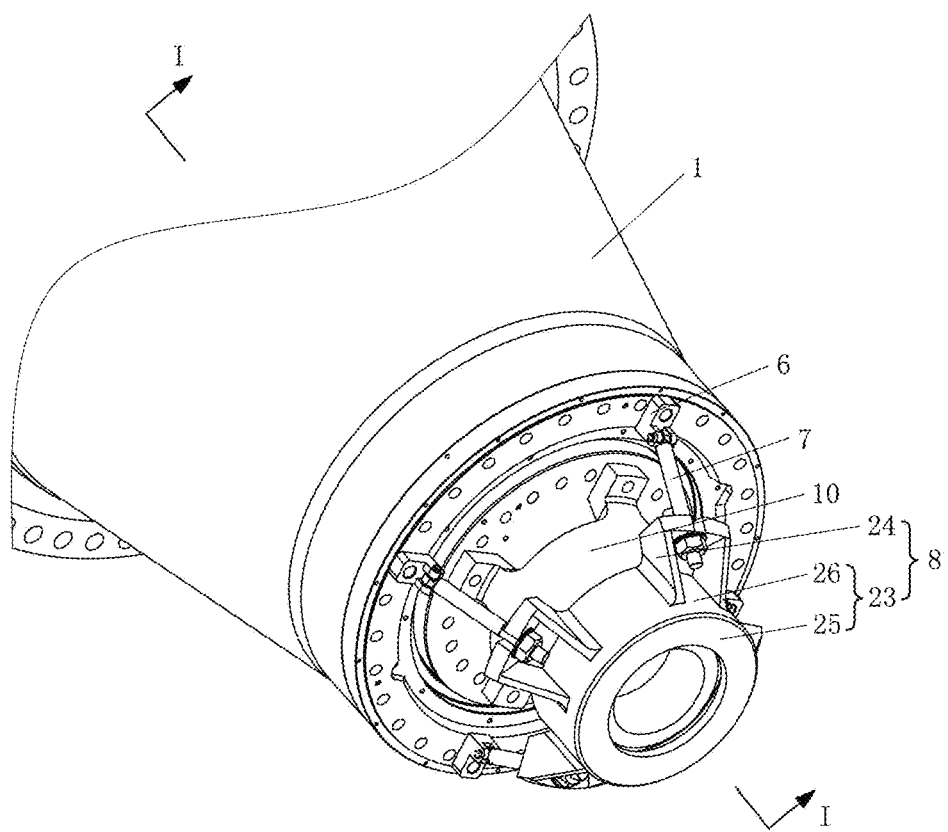
FIG. 1 is a schematic perspective view of a shaft system including a support apparatus for a shaft system according to an exemplary embodiment of the present application.

Reference numerals are as follows:

1: first shaft; 2: second shaft; 3: bearing; 4: bearing outer ring end cover; 5: bearing inner ring end cover; 6: fixed seat; 7: connecting portion; 8, 15: shaft end support; 9: spring; 10: support portion; 11: auxiliary bearing; 12: gasket; 13, 16: pre-tightening member; 14, 17: connecting assembly; 18: first fixed seat; 19: first bearing seat; 20: second fixed seat; 21: support member; 22: second bearing seat; 23: connecting end cap; 24: mounting seat; 25: shaft end top plate; 26: cylinder.

DETAILED DESCRIPTION OF THE EMBODIMENTS

Embodiments of the present application are described more fully with reference to the accompanying drawings, in which exemplary embodiments of the present application are shown.

A shaft system generally includes a first shaft 1, a second shaft 2, and a bearing 3 arranged between the first shaft 1 and the second shaft 2. The first shaft 1 is sleeved outside the second shaft 2, and the bearing 3 is arranged between the first shaft 1 and the second shaft 2 in a radial direction of the shaft system, so that the first shaft 1 is rotatable relative to the second shaft 2 by means of the bearing 3. When a rotating member connected to the first shaft 1 (for example, the movable shaft) is subjected to an axial load, the axial load is transmitted to the bearing 3 through the first shaft 1, and then transmitted to the second shaft 2 (for example, the fixed shaft) through the bearing 3. During this process, the bearing 3 bears part of the axial load, which will adversely affect the fatigue life of the bearing 3. In addition, since the bearing 3 is arranged in the shaft system, maintenance, disassembly and replacement are difficult and costly.

In order to solve at least one of the above technical problems, a support apparatus is provided according to the present application. The support apparatus is configured to be arranged at a first end of the shaft system in the axial direction. In this application, for example, based on the orientation shown in FIG. 2, an end of a component or assembly located on the right side in the axial direction relative to the center of the component or assembly is referred to as a first end, and an end of the component or assembly located on the left side in the axial direction relative to the center of the component or assembly is referred to as a second end. A part of the support apparatus is fixedly connected to the first shaft 1, and the other part of the support apparatus is fixedly connected to the second shaft 2 to provide an adjustable axial preload (or axial pre-stress load), so that at least part of the axial load generated by the rotating member is offset by the axial pre-stress provided by the support apparatus, or is transmitted to the second shaft 2 through the support apparatus without being transmitted through the bearing 3. The support apparatus can prevent the axial load from acting directly on the bearing 3 or reduce the axial load acting on the bearing 3, thereby improving the fatigue life of the bearing 3.

The structure of the support apparatus for the shaft system according to the present application will be described in detail below with reference to the accompanying drawings.

Figure 2:
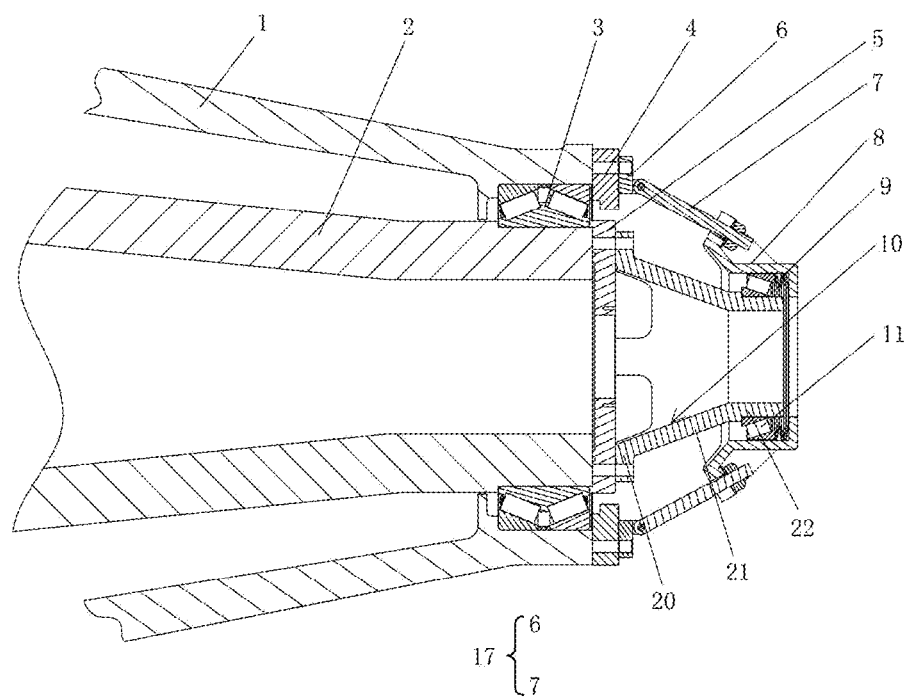
FIG. 2 is a partial cross-sectional view taken along line I-I of FIG. 1.
Figure 3:
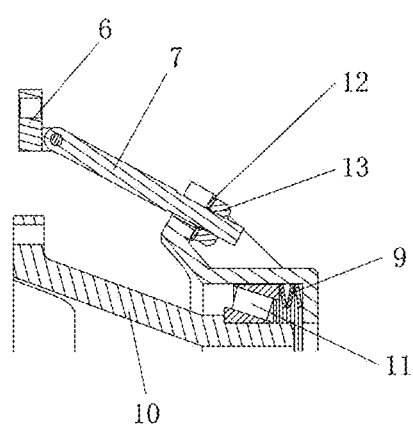
FIG. 3 is a partial enlarged view of FIG. 2.

In conjunction with FIGS. 1 to 3 of the present application, a support apparatus for a shaft system according to an exemplary embodiment of the present application includes: a shaft end support 8, at least part of which is supported in the axial direction on an outer side of a shaft end surface of a first end of the second shaft 2; a connecting assembly 17, connected between a first end of the first shaft 1 and the shaft end support 8; and a pre-tightening member 13, configured to adjustably connect the connecting assembly 17 with the shaft end support 8 for applying an axial pre-stress to the first shaft 1 from the first end toward the outside of the shaft system (for example, the outside of the shaft system in the axial direction). As an example, the pre-tightening member 13 may exert a pre-tightening force away from the first shaft 1 on the first shaft 1 along the length direction of the connecting assembly 17 (the pre-tightening force may be applied along the axial direction of the shafting system or in a predetermined angle relative to the axial direction of the shafting system), thereby applying an axial pre-stress to the first shaft 1.

The shaft end support 8 is rotatably supported on the end of the first end of the second shaft 2 relative to the second shaft 2, so that the connecting assembly 17 is rotatable relative to the second shaft 2 and can have a positioning support function on the connecting assembly 17.

Generally, first end surfaces of the first end of the second shaft 2 and the first end of the first shaft 1 in the axial direction are approximately flush with each other. In this case, in order to provide sufficient axial pre-stress or to increase an adjustable range of the axial pre-stress, the support apparatus may further include: a support portion 10 and an auxiliary bearing 11. A first end of the support portion 10 faces towards the shaft end support 8 in the axial direction, and a second end of the support portion 10 is fixedly connected to the shaft end surface of the first end of the second shaft 2. The auxiliary bearing 11 is provided at the first end of the support portion 10 and located outside the support portion 10 in a radial direction of the shaft system. The shaft end support 8 is supported on the support portion 10 by means of the auxiliary bearing 11 and is rotatable relative to the support portion 10 by means of the auxiliary bearing 11. If the first end of the second shaft 2 protrudes a predetermined length relative to the first shaft 1 in the axial direction, the protruding portion of the second shaft 2 protruding relative to the first end of the first shaft 1 can be used as the above support portion 10. The shaft end support 8 may be supported directly on the protruding portion of the second shaft 2. In other words, it can be understood that the support portion 10 and the second shaft 2 may be formed separately and then fixed together, or the support portion 10 may be integrally formed with the second shaft 2. For wind turbines in service, the support portion 10 may be formed separately and then installed to the second shaft 2 to facilitate installation and disassembly.

The support portion 10 includes a second fixed seat 20, a support member 21 and a second bearing seat 22 along the axial direction. The second fixed seat 20 is fixedly connected to the shaft end surface of the first end of the second shaft 2, and the auxiliary bearing 11 is arranged between a radical inner wall of the connecting assembly 17 and a radial outer wall of the second bearing seat 22 along the radial direction. The support member 21 is inclined from the second bearing seat 22 toward the second fixed seat 20. In order to increase the bearing area of the axial pre-stress load and reduce the load on the support member 21, the support member 21 may be gradually expanded from the second bearing seat 22 toward the second fixed seat 20. The present application is not limited thereto. Alternatively, the support member 21 may be arranged parallel to the axial direction from the second bearing seat 22 toward the second fixed seat 20.

Generally, in order to fix the bearing 3 in the shaft system and prevent the bearing 3 from falling off or moving along the axial direction, the shaft system includes a bearing limiting portion provided at the first end of the second shaft 2. The bearing limiting portion may be, for example, a bearing inner ring end cover 5 to limit a bearing inner ring of the bearing 3. In order to fixedly connect the support portion 10 to the shaft end surface of the first end of the second shaft 2, the second fixed seat 20 of the support portion 10 may be connected to the bearing inner ring end cover 5 and thereby connected to the first end of the second shaft 2. However, the present application is not limited thereto. Alternatively, the structure of the second fixed seat 20 may be such changed that it can be connected to the first end of the second shaft 2 and can also prevent the bearing 3 from detaching, and can directly fix the second fixed seat 20 to the shaft end surface of the first end of the second shaft 2. Therefore, the bearing inner ring end cover 5 can be omitted, as long as the second fixed seat 20 has a bearing limiting portion that protrudes along the radial direction of the shaft system to prevent the bearing 3 from detaching.

As shown in the exemplary embodiments in FIGS. 1 to 6, the support member 21 may be a cylindrical member. For example, the support member 21 may be configured as a hollow cone to facilitate processing and manufacturing. In this case, the second fixed seat 20, the support member 21, and the second bearing seat 22 may be integrally formed. However, the present application is not limited thereto. Alternatively, the support member 21 may be provided as rod-shaped members distributed at intervals along a circumferential direction of the support portion 10.

The auxiliary bearing 11 may include an inner ring and an outer ring and rollers arranged between the inner ring and the outer ring. Referring to FIGS. 1 and 2 of the present application, one of the inner ring and the outer ring is connected to the connecting assembly 17, and the other of the inner ring and the outer ring is connected to the support portion 10. In an embodiment, the auxiliary bearing 11 mainly bears axial force, which is, for example, but not limited to a thrust bearing. Alternatively, the auxiliary bearing 11 can bear both axial force and radial force, which is, for example, but not limited to an angular contact ball bearing. Since the auxiliary bearing 11 is arranged in a support apparatus with a relatively simple structure, if the auxiliary bearing 11 fails or reaches the limit of the fatigue life, the auxiliary bearing 11 can be easily replaced with a spare auxiliary bearing 11 without having to disassemble the entire shaft system, unlike the bearing 3 in the shaft system. In this way, the replacement time and costs can be saved, and the production efficiency can be improved.

As shown in FIG. 1, the shaft end support 8 may include a connecting end cap 23 and a mounting seat 24 connected to an outer periphery of the connecting end cap 23. The connecting end cap 23 includes a shaft end top plate 25 and a cylinder 26 extending from the shaft end top plate 25 toward the second end of the shaft system along the axial direction of the shaft system. The mounting seat 24 is formed on an outer periphery of the cylinder 26. In the radial direction of the shaft system, an inner diameter of the cylinder 26 is greater than an outer contour size of the first end of the support portion 10. The cylinder 26 is sleeved on the first end of the support portion 10, and the auxiliary bearing 11 is provided between an inner side of the cylinder 26 and an outer side of the first end of the support portion 10. The cylinder 26 may be in a bell-mouth shape, a diameter of which increases along the axial direction of the shaft system from the shaft end top plate 25 toward the second end of the shaft system, and the mounting seat 24 may be a leg extending outwardly from an outer peripheral surface of the cylinder 26.

The connecting assembly 17 may include: a fixed seat 6, configured to be fixedly connected to the shaft end surface of the first end of the first shaft 1; and a connecting portion 7, connected between the fixed seat 6 and the mounting seat 24 of the shaft end support 8. The connecting portion 7 is inclined from the shaft end support 8 towards the fixed seat 6 or is parallel to shaft end support 8. For example, in order to increase the bearing area of the axial load and reduce the load on the connecting portion 7, the connecting portion 7 may be gradually expanded along the axial direction from the shaft end support 8 toward the fixed seat 6.

Generally, in order to fix the bearing 3 in the shaft system and prevent the bearing 3 from falling off or moving along the axial direction, the shaft system includes a bearing outer ring end cover 4 provided at the first end of the first shaft 1 to limit the bearing outer ring of the bearing 3. The fixed seat 6 may be fixed to the first end of the first shaft 1 by being connected to the bearing outer ring end cover 4. However, the present application is not limited thereto. Alternatively, the structure of the fixed seat 6 may be such changed that it can be connected between the first end of the first shaft 1 and the connecting portion 7, and can also axially position the bearing 3 and prevent the bearing 3 from detaching. Therefore, the bearing outer ring end cover 4 can be omitted, and the fixed seat 6 can be directly fixed to the shaft end surface of the first end of the first shaft 1, as long as the fixed seat 6 is configured to have a part that protrudes along the radial direction of the shaft system to axially position the bearing 3 and prevent the bearing 3 from detaching.

The connecting portion 7 is rod-shaped members distributed at intervals along the circumferential direction of the support portion 10. The rod-shaped members are hinged to the fixed seat 6. In this way, the installation and dissembling of the rod-shaped members and the fixed seat 6 can be more flexible and convenient. For example, the rod-shaped members may be hinged to the fixed seat 6 first, and then connected to the mounting seat 24 of the shaft end support 8. Alternatively, the rod-shaped members may be installed to the mounting seat 24 of the shaft end support 8 first, and then connected to the fixed seat 6. The number of the rod-shaped members may be multiple, for example, three or more, and the multiple rod-shaped members may be evenly distributed at a predetermined interval along the circumferential direction of the support portion 10 to jointly bear the axial load. As an example, as shown in FIGS. 1 to 3, the number of the rod-shaped members may be set to four, and adjacent two of the rod-shaped members are spaced at an angle of 90 degrees. In this case, four fixed seats 6 are correspondingly provided, and adjacent fixed seats are also spaced at an angle of 90 degrees. However, the embodiment of the fixed seat 6 is not limited thereto. Alternatively, the fixed seat 6 may be continuously arranged in a circular ring shape. In order to facilitate the installation of the rod-shaped members, the fixed seats 6, the mounting seats 24 and the rod-shaped members have the same number as one another.

In the present exemplary embodiment, adjustable axial pre-stress may be provided by adjusting the preload force of the pre-tightening member 13. The pre-tightening member 13 may be configured as a nut. The first end of each of the rod-shaped members is provided with external threads. A through hole is formed in the mounting seat 24 of the shaft end support 8. The first end of the rod-shaped member is in threaded connection with the nut after passing through the through hole. In this way, the magnitude of the axial pre-stress can be adjusted by adjusting the amount of thread engagement between the nut and the first end of the rod-shaped member. After the support apparatus is installed, the nut is pre-tightened with a torque wrench to generate a pre-stress load. Different pre-stress loads can be achieved by controlling the torque of the torque wrench.

In order to increase the contact surface, prevent loosening and disperse pressure to protect parts, a gasket 12 may be provided between the nut serving as the pre-tightening member 13 and a connection surface of the shaft end support 8.

In order to realize uniform preload transmitted to the auxiliary bearing 11, the support apparatus may be further provided with a spring 9. The spring 9 is axially arranged between the auxiliary bearing 11 and the axial end surface of the shaft end support 8 facing towards the auxiliary bearing 11 and is in contact with the axial end surface of the shaft end support 8. The spring 9 is embedded inside the auxiliary bearing 11. Preferably, the spring 9 may be configured as a disc spring, so that the preload transmitted to the auxiliary bearing 11 is more uniform. However, the form of the spring 9 is not limited to a disc spring, and any form that can make the preload transmitted to the auxiliary bearing 11 more uniform is applicable.

Figure 4:
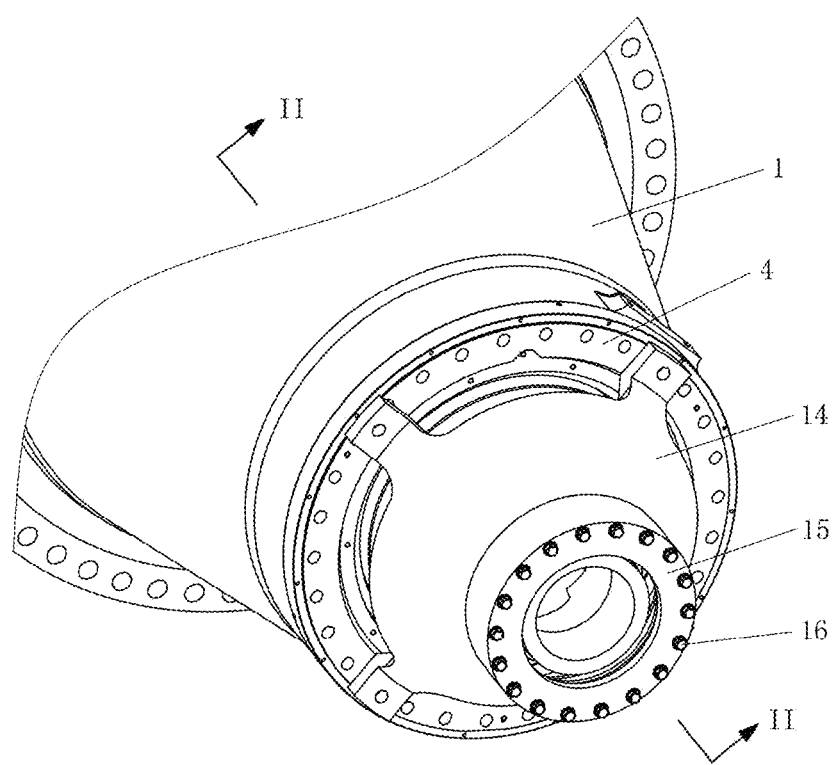
FIG. 4 is a schematic perspective view of a shaft system including a support apparatus for a shaft system according to another exemplary embodiment of the present application.
Figure 5:
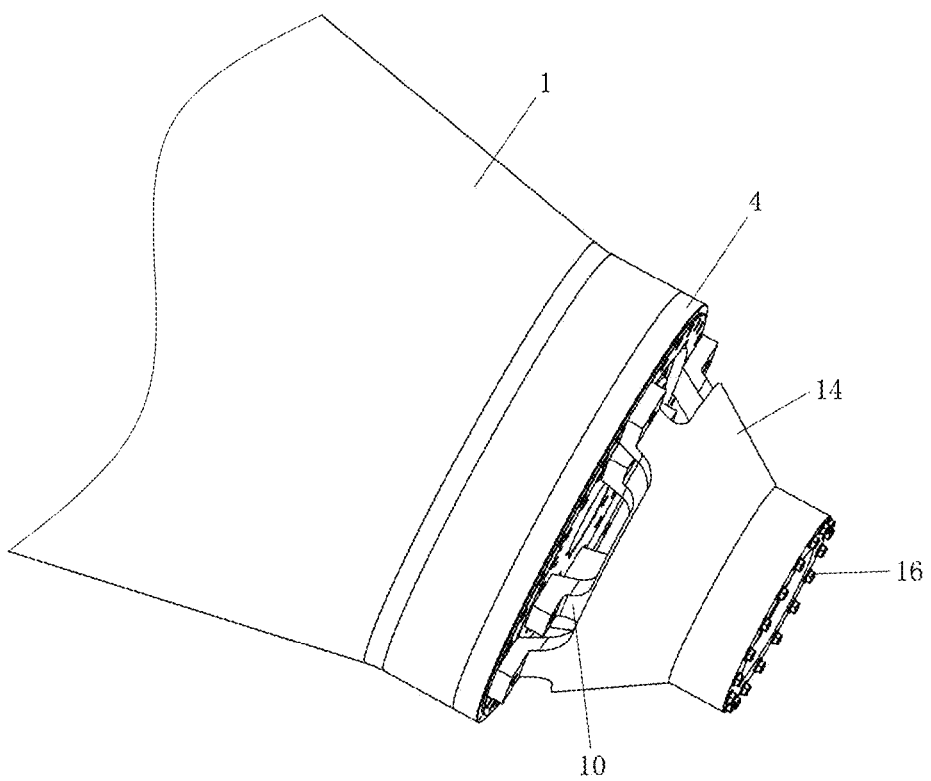
FIG. 5 is a schematic perspective view of the shaft system shown in FIG. 4 from another perspective.
Figure 6:
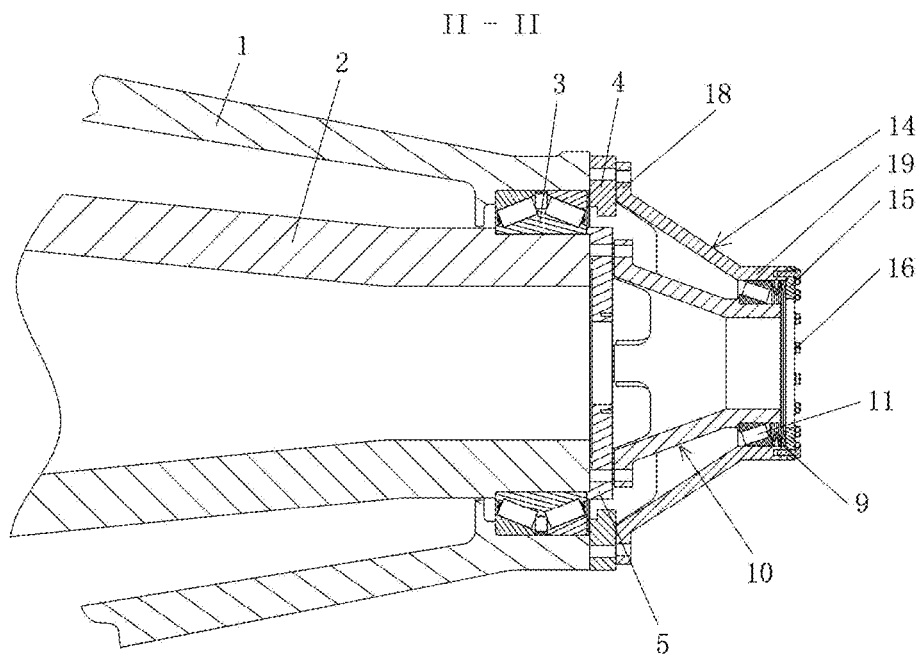
FIG. 6 is a partial cross-sectional view taken along line II-II of FIG. 4.

FIGS. 4 to 6 illustrate a support apparatus for a shaft system according to another exemplary embodiment of the present application. In the present exemplary embodiment, except that the structures of the connecting assembly, the shaft end support and the pre-tightening member are different from the structures of the connecting assembly, the shaft end support and the pre-tightening member of the support apparatus shown in FIGS. 1 to 3 above, the structures of other components are the same or similar. Therefore, in order to make the description more concise and clear, detailed descriptions of the structures of the same or similar components will be omitted below.

As shown in FIGS. 4 to 6, in another exemplary embodiment according to the present application, the connecting assembly 14 is a cylindrical member, a first end of the cylindrical member along the axial direction is provided with a first bearing seat 19, and the auxiliary bearing 11 is arranged between a radial inner wall of the first bearing seat 19 and a radial outer wall of the support portion 10 along the radial direction. A second end of the cylindrical member along the axial direction is provided with a first fixed seat 18 to be connected to the shaft end surface of the first end of the first shaft 1.

In a case that the connecting assembly 14 is a cylindrical member, the shaft end support 15 may be an annular plate connected to the axial end surface of the first bearing seat 19.

In the present exemplary embodiment, one of the inner ring and the outer ring of the auxiliary bearing 11 is connected to the shaft end support 15, and the other of the inner ring and the outer ring is connected to the support portion 10.

The pre-tightening member 16 may be a bolt. A first threaded hole and a second threaded hole extending along the axial direction are respectively formed in the shaft end support 15 and the first bearing seat 19, and the bolt is in threaded connection with the first threaded hole and the second threaded hole in sequence. Here, the magnitude of the axial pre-stress load can be adjusted by adjusting the amount of thread engagement between the bolt and the first bearing seat 19. However, the embodiment of the pre-tightening member 16 is not limited thereto. Alternatively, the pre-tightening member 16 may be implemented as a pre-tightening member in which a component (such as a screw rod) with external threads and a nut are engaged with each other, as long as it can provide axial preload.

According to another exemplary embodiment of the present application, a wind turbine is further provided. The wind turbine includes: a generator, including a shaft system. The shaft system includes a first shaft 1, a second shaft 2, and a bearing 3. The shaft 1 is sleeved outside the second shaft 2, and the bearing 3 is arranged between the first shaft 1 and the second shaft 2 in the radial direction of the shaft system, so that the first shaft 1 is rotatable relative to the second shaft 2 by means of the bearing 3. The first shaft 1, the second shaft 2, and the bearing 3 are coaxially arranged. Here, the first shaft 1 may be referred to as a movable shaft, the second shaft 2 may be referred to as a fixed shaft, and the bearing 3 may be generally referred to as a main bearing.

Figure 7:
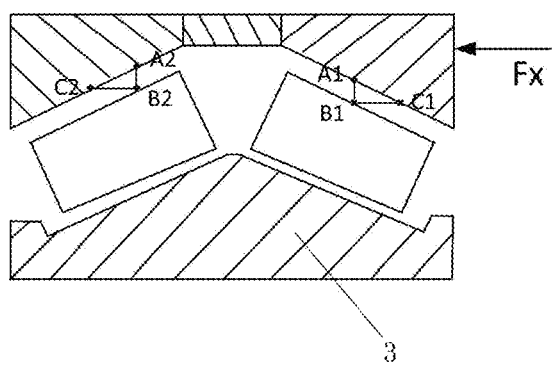
FIG. 7 is an enlarged schematic structural view showing a double-row roller bearing.

Referring to FIG. 7, the main bearing is a double-row roller bearing. Specifically, the main bearing may be a double-row tapered roller bearing, a double-row spherical roller bearing, or other bearings that can bear radial load.

Assembly clearance is generally reserved after the main bearing is assembled to the shaft system. Its function is to reserve space for the thermal expansion of the inner ring, outer ring, and the rollers of the main bearing and to preserve the lubricating oil film. When the inner ring or outer ring of the main bearing is subjected to the axial load, the double-row rollers are loaded unevenly, that is, one row of rollers are loaded with a large load, and the other row of rollers are loaded with a small load. As shown in FIG. 7, A1B1 and A2B2 are the radial clearances of the front-row and rear-row roller raceways respectively, and B1C1 and B2C2 are the axial clearances of the front-row and rear-row roller raceways respectively. When the outer ring raceway of the main bearing bears the axial force Fx, the axial clearance of the front row decreases and the axial clearance of the rear row increases, that is, B1C1 decreases and B2C2 increases. As a result, the load borne by the front-row roller raceway is greater than the load borne by the rear-row roller raceway, and the rollers of the front row are more likely to fail, thereby adversely affecting the fatigue life of the entire main bearing.

In order to solve the above technical problems, a wind turbine including the above generator and the above support apparatus is provided according to the present application. The support apparatus according to the present application is installed to the first end of the shaft system of the generator in the axial direction, when the inner ring raceway of the main bearing bears the axial load of the support apparatus, the axial force Fx can be directly transmitted to the fixed shaft, instead of having to be transmitted to the fixed shaft through the main bearing, so that the main bearing basically no longer bears the axial wind load or bears a small axial load. For the double-row roller bearing, the uneven loading of the two rows of rollers is eliminated, and the rollers in the front and rear rows are loaded more evenly, thereby improving the fatigue life of the main bearing.

In addition, for units in service, the main bearing has been operated for a certain period of time, and the wear of the front-row rollers will be greater than the wear of the rear-row rollers. The support apparatus can adjust the axial pre-tightening force so that the support apparatus after being mounted in place generates the axial pre-stress load, so that the rear-row rollers of the main bearing bear a greater load, thereby reducing the wear of the front-row rollers and improving the overall fatigue life of the main bearing, so that the service life of the main bearing is longer than the design life.

In addition, compared with replacing the main bearing, mounting the support apparatus for the wind turbine in-service not only saves time, but also reduces the costs.

The support apparatus for a shaft system according to the present application can prevent the axial load from acting directly on the bearing of the shaft system or reduce the axial load acting on the bearing of the shaft system, thereby improving the fatigue life of the bearing of the shaft system. The wind turbine including the above support apparatus can increase the fatigue life of the generator by increasing the fatigue life of the main bearing.

Although the present application has been particularly shown and described with reference to the exemplary embodiments thereof, it should be understood by those skilled in the art that various changes in form and details can be made without departing from the spirit and scope of the present application defined by the appended claims.

The invention claimed is:

1. A support apparatus for a shaft system, the shaft system comprising a first shaft, a second shaft, and a bearing arranged between the first shaft and the second shaft, the first shaft being sleeved outside the second shaft and rotatable relative to the second shaft by the bearing, wherein the support apparatus is configured to be provided at a first end of the shaft system in an axial direction, and the support apparatus comprises:
   a support portion for being fixed to a shaft end surface of a first end of the second shaft;
   a shaft end support, at least part of which is supported on the support portion and is rotatable relative to the support portion;
   a connecting assembly, configured to be connected between a first end of the first shaft and the shaft end support in the axial direction of the shaft system; and
   a pre-tightening member, configured to adjustably connect the connecting assembly with the shaft end support and configured to apply an axial pre-stress to the first shaft.

2. The support apparatus for a shaft system according to claim 1, wherein
   a first end of the support portion faces towards the shaft end support in the axial direction, and a second end of the support portion is fixedly connected to the shaft end surface of the first end of the second shaft; and
   the support apparatus further comprises an auxiliary bearing, provided at the first end of the support portion and located outside the support portion in a radial direction of the shaft system, wherein the shaft end support is supported on the support portion by the auxiliary bearing and is rotatable relative to the support portion by the auxiliary bearing.

3. The support apparatus for a shaft system according to claim 2, wherein the shaft end support comprises a connecting end cap and a mounting seat connected to an outer periphery of the connecting end cap, the connecting end cap comprises a shaft end top plate and a cylinder extending from the shaft end top plate toward a second end of the shaft system along the axial direction of the shaft system, the mounting seat is formed on an outer periphery of the cylinder, and
   in the radial direction of the shaft system, an inner diameter of the cylinder is greater than an outer contour size of the first end of the support portion, the cylinder is sleeved on the first end of the support portion, and the auxiliary bearing is provided between an inner side of the cylinder and an outer side of the first end of the support portion.

4. The support apparatus for a shaft system according to claim 3, wherein the connecting assembly comprises:
   a fixed seat, configured to be fixedly connected to the shaft end surface of the first end of the first shaft; and
   a connecting portion, connected between the fixed seat and the mounting seat.

5. The support apparatus for a shaft system according to claim 4, wherein the connecting portion is rod-shaped members distributed at intervals along a circumferential direction of the support portion, wherein the rod-shaped members are hinged to the fixed seat.

6. The support apparatus for a shaft system according to claim 5, wherein the number of the rod-shaped members is two or more, and the fixed seats, the mounting seats and the rod-shaped members have the same number as one another.

7. The support apparatus for a shaft system according to claim 5, wherein the cylinder is in a bell-mouth shape, a diameter of which increases along the axial direction of the shaft system from the shaft end top plate toward the second end of the shaft system, and the mounting seat is a leg extending outwardly from an outer peripheral surface of the cylinder.

8. The support apparatus for a shaft system according to claim 5, wherein the pre-tightening member is a nut, a first end of each of the rod-shaped members is provided with external threads, a through hole is formed in the mounting seat, and the first end of the rod-shaped member is in threaded connection with the nut after passing through the through hole.

9. The support apparatus for a shaft system according to claim 3, wherein the support apparatus further comprises a spring, which is arranged between the auxiliary bearing and the shaft end support along the axial direction and is in contact with an axial inner end surface of the shaft end support.

10. The support apparatus for a shaft system according to claim 2, wherein,
   the connecting assembly is a cylindrical member, a first end of the cylindrical member along the axial direction is provided with a first bearing seat, the auxiliary bearing is arranged between a radial inner wall of the first bearing seat and a radial outer wall of the support portion along the radial direction of the shaft system, a second end of the cylindrical member along the axial direction is provided with a first fixed seat to be connected to the shaft end surface of the first end of the first shaft; and
   the shaft end support is an annular plate connected to an axial end surface of the first bearing seat.

11. The support apparatus for a shaft system according to claim 10, wherein the pre-tightening member is a bolt, a first threaded hole and a second threaded hole extending along the axial direction are respectively formed in the shaft end support and the first bearing seat, and the bolt is in threaded connection with the first threaded hole and the second threaded hole in sequence.

12. The support apparatus for a shaft system according to claim 10, wherein the support apparatus further comprises a spring, which is arranged between the auxiliary bearing and the shaft end support along the axial direction and is in contact with an axial inner end surface of the shaft end support.

13. The support apparatus for a shaft system according to claim 2, wherein the support portion comprises a second fixed seat, a support member and a second bearing seat along the axial direction, the second fixed seat is fixedly connected to a shaft end surface of a first end of the second shaft, and the auxiliary bearing is arranged between a radical inner wall of the connecting assembly and a radial outer wall of the second bearing seat along the radial direction.

14. The support apparatus for a shaft system according to claim 13, wherein the support member is inclined from the second bearing seat toward the second fixed seat.

15. The support apparatus for a shaft system according to claim 13, wherein the support member is rod-shaped members distributed at intervals along a circumferential direction of the support portion; or the support member is a cylindrical member.

16. The support apparatus for a shaft system according to claim 13, wherein the support apparatus further comprises a spring, which is arranged between the auxiliary bearing and the shaft end support along the axial direction and is in contact with an axial inner end surface of the shaft end support.

17. The support apparatus for a shaft system according to claim 2, wherein the support apparatus further comprises a spring, which is arranged between the auxiliary bearing and the shaft end support along the axial direction and is in contact with an axial inner end surface of the shaft end support.

18. A wind turbine, comprising:
   the support apparatus for a shaft system according to claim 1; and
   a generator, comprising the shaft system.

19. The wind turbine according to claim 18, wherein the bearing is a double-row roller bearing.

20. The wind turbine according to claim 18, wherein the support portion of the support apparatus is integrally formed with the second shaft of the shaft system.

* * * * *